US 10,540,356 B2
Jan. 21, 2020

(12) United States Patent
Beier et al.

(54) TRANSPARENT ANALYTICAL QUERY ACCELERATOR OVER ENCRYPTED DATA

(71) Applicant: International Business Machines Corporation, Armonk, NY (US)

(72) Inventors: Felix Beier, Holzgerlingen (DE); Nicole Finnie, Boeblingen (DE); Namik Hrle, Boeblingen (DE); Jens Mueller, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 100 days.

(21) Appl. No.: 15/792,843

(22) Filed: Oct. 25, 2017

(65) Prior Publication Data

US 2019/0121892 A1    Apr. 25, 2019

(51) Int. Cl.
*G06F 16/00* (2019.01)
*G06F 16/2453* (2019.01)
*H04L 9/08* (2006.01)
*G06F 16/28* (2019.01)
*G06F 16/2455* (2019.01)

(52) U.S. Cl.
CPC .... *G06F 16/24547* (2019.01); *G06F 16/2455* (2019.01); *G06F 16/283* (2019.01); *H04L 9/0861* (2013.01); *H04L 9/0894* (2013.01)

(58) Field of Classification Search
CPC ........... G06F 16/24547; G06F 16/2455; G06F 16/283; H04L 9/0861; H04L 9/9894
USPC ........................................................ 713/189
See application file for complete search history.

(56) References Cited

U.S. PATENT DOCUMENTS

| 9,081,978 | B1 | 7/2015 | Connolly et al. | |
|---|---|---|---|---|
| 9,209,971 | B2 | 12/2015 | Sathaye et al. | |
| 9,652,346 | B2 | 5/2017 | Wall et al. | |
| 2004/0243816 | A1* | 12/2004 | Hacigumus | H04L 9/0894 713/193 |
| 2005/0147240 | A1* | 7/2005 | Agrawal | G06F 21/60 380/28 |
| 2006/0236104 | A1* | 10/2006 | Wong | G06F 21/6227 713/168 |

(Continued)

OTHER PUBLICATIONS

Hildenbrand, Stefan, et al. "Query processing on encrypted data in the cloud by." Technical report 735 (2011). (Year: 2011).*

(Continued)

*Primary Examiner* — Syed A Zaidi
(74) *Attorney, Agent, or Firm* — Cantor Colburn LLP; Richard Wilhelm

(57) ABSTRACT

The present disclosure relates to a method for processing queries in a database system having a first database engine and a second database engine. The method includes: storing a first instance of a first table in the first database engine in plaintext; encrypting at least one predefined column of the first table, resulting in a second instance of the first table containing at least part of the data of the first table in encrypted format. The second instance of the first table in the second database engine is stored in the second database engine. It may be determined whether to execute a received query in the first database engine on the first table or in the second database engine on the second instance of the first table, where the determination involves a comparison of the query with encryption information.

18 Claims, 4 Drawing Sheets

(56) References Cited

U.S. PATENT DOCUMENTS

| | | | |
|---|---|---|---|
| 2007/0079386 A1* | 4/2007 | Metzger | G06F 21/6227 726/29 |
| 2008/0133935 A1* | 6/2008 | Elovici | G06F 21/6227 713/193 |
| 2008/0281784 A1 | 11/2008 | Zane et al. | |
| 2009/0046862 A1* | 2/2009 | Ito | H04L 9/0836 380/277 |
| 2010/0169665 A1* | 7/2010 | Kang | G06F 21/6227 713/189 |
| 2011/0208695 A1 | 8/2011 | Anand et al. | |
| 2012/0284529 A1* | 11/2012 | Crowe | G06F 21/6227 713/189 |
| 2012/0323884 A1 | 12/2012 | Draese et al. | |
| 2013/0191650 A1* | 7/2013 | Balakrishnan | G06F 21/6227 713/190 |
| 2014/0281512 A1* | 9/2014 | Arasu | G06F 21/602 713/165 |
| 2015/0033032 A1* | 1/2015 | Furukawa | H04L 9/0861 713/189 |
| 2015/0058629 A1 | 2/2015 | Yarvis et al. | |
| 2015/0074041 A1 | 3/2015 | Bhattacharjee et al. | |
| 2015/0178506 A1 | 6/2015 | Elovici et al. | |
| 2015/0295716 A1* | 10/2015 | Liu | H04L 9/008 713/191 |
| 2015/0317483 A1 | 11/2015 | Mori | |
| 2016/0125141 A1* | 5/2016 | Raisaro | H04L 9/008 713/189 |
| 2016/0132692 A1* | 5/2016 | Kerschbaum | G06F 21/6227 713/189 |
| 2016/0232362 A1* | 8/2016 | Conway | G06F 16/2458 |
| 2016/0328566 A1 | 11/2016 | Nellamakkada | |
| 2017/0099262 A1* | 4/2017 | Kerschbaum | H04L 9/00 |
| 2017/0103228 A1 | 4/2017 | Yavuz | |
| 2018/0357427 A1* | 12/2018 | Lindell | G06F 21/6227 |
| 2019/0272381 A1 | 9/2019 | Yoon | |

OTHER PUBLICATIONS

Tu, Stephen, et al. "Processing analytical queries over encrypted data." Proceedings of the VLDB Endowment. vol. 6. No. 5. VLDB Endowment, 2013. (Year: 2013).*

A. Boldyreva, et al., Order-Preserving Symmetric Encryption, Jun. 10, 2009, 24 pages.

CryptDB, retrieved from the internet: http://css.csail.mit.edu/cryptdb/, Jul. 26, 2017, 3 pages.

Deterministic Encryption—Wikipedia, retrieved from the internet: https://en.wikipedia.org/wiki/Deterministic_encryption, Jul. 27, 2017, 3 pages.

IBM DB2 Analytics Accelerator for z/OS, Version 4.1.0, Achiving partition or table data with the High-Performance Storage Saver, retrieved from the internet: https://www.ibm.com/support/knowledgecenter/SS4LQ8_4.1.0/com.i, Jul. 27, 2017, 7 pages.

List of IBM Patents or Patent Applications Treated as Related, Oct. 25, 2017, 2 pages.

Microsoft, SQL Server Encryption, retrieved from the internet: https://msdn.microsoft.com/en-GB/library/mt163865.aspx, Jul. 25, 2017, 166 pages.

Probabilistic Encryption—Wikipedia, retrieved from the internet: https://en.wikipedia.org/wiki/Probabilistic_encryption, Jul. 27, 2017, 2 pages.

R. Agrawal, et al., Order Preserving Encryption for Numeric Data, SIGMOD Jun. 2004, 12 pages.

R. Popa et al., CryptDB: Protecting Confidentiality with Encrypted Query Processing, SOSP Oct. 2011, 16 pages.

SAP SEEED, Apr. 16, 2014, 19 pages.

U.S. Appl. No. 15/792,848, filed Oct. 25, 2017, Entitled: Data Coherency Between Trusted DBMS and Untrusted DBMS, First Named Inventor: Felix Beier.

Beier. et al. "Data Coherency Between Trusted DBMS and Untrusted DBMS" U.S. Appl. No. 16/408,568, filed May 10, 2019.

IBM DB2 Analytics Accelerator for z/OS, Version 5.1.0, Incremental Updates, retrieved from the internet: http://www.ibm.com/support/knowledgecenter/SS4LQ8_5.1.0/com.ibm.datatools.aqt.doc/installmanual/topics/tp_idaa_inst_incr_updt.html, Jul. 26, 2014, 4 pages.

List of IBM Patents or Patent Applications Treated as Related; Date Filed Aug. 13, 2019, 2 pages.

Programming for the instrumentation facility interface (IFI), retrieved from the internet: https://www.ibm.com/support/knowledgecenter/SSEPEK_10.0.0/perf/src/tpc/db2z_program4ifi.html, Jul. 26, 2017, 4 pages.

Beier et al., "Transparent Analytical Query Accelerator Over Encrypted Data," U.S. Appl. No. 16/409,920, filed May 5, 2019.

List of IBM Patents or Patent Applications Treated as Related; Date May 13, 2019 2 pages.

Ferretti, et al., "Distributed, Concurrent, and Independent Access to Encrypted Cloud Databases," IEEE transactions on parallel and distributed systems vol. 25, No. 2 (2014): pp. 437-446 (Year: 2014).

* cited by examiner

TRANSPARENT ANALYTICAL QUERY ACCELERATOR OVER ENCRYPTED DATA

BACKGROUND

The present invention relates to the field of digital computer systems, and more specifically, to a method for processing queries in a database system.

Performing database operations on a cloud database is increasingly used. However, for security-demanding clients like banks or insurance companies, secure access to their data in database servers hosted in the public cloud may be an absolute requirement. That poses a great challenge for developing secure database solutions.

SUMMARY

Various embodiments provide a method for processing queries in a database system, a computer program product and database system as described by the subject matter of the independent claims. Advantageous embodiments are described in the dependent claims. Embodiments of the present invention can be freely combined with each other if they are not mutually exclusive.

In one aspect, the invention relates to a method for processing queries in a database system having a first database engine and a second database engine. The method includes storing a first instance of a first table in the first database engine in plaintext, encrypting at least one predefined column of the first table, resulting in a second instance of the first table containing at least part of the data of the first table in encrypted format, storing the second instance of the first table in the second database engine, maintaining encryption information about encryption methods and encryption keys used for the encryption in the database system, receiving a query against the first table, and determining whether to execute the query in the first database engine on the first table or the second database engine on the second instance of the first table, the determination involving a comparison of the query with the encryption information of the second instance of the first table, the determining resulting in a decision. In case of the decision to execute the query in the second database engine, the query is rewritten against the second instance of the first table by using at least the encryption information.

In another aspect, the invention relates to a computer program product including a computer-readable storage medium having computer-readable program code embodied therewith, the computer-readable program code configured to implement all of steps of the method according to preceding embodiments.

In another aspect, the invention relates to a database system having a first database engine and a second database engine. The database system is configured to store a first instance of a first table in the first database engine in plaintext, and encrypt at least one predefined column of the first table, resulting in a second instance of the first table containing at least part of the data of the first table in encrypted format. The second instance of the first table is stored in the second database engine. The database system is further configured to maintain encryption information about encryption methods and encryption keys used for the encryption in the database system, receive a query against the first table, determine whether to execute the query in the first database engine on the first table or the second database engine on the second instance of the first table, the determination involving a comparison of the query with the encryption information of the second instance of the first table, the determining resulting in a decision, and in case of the decision to execute the query in the second database engine, rewrite the query against the second instance of the first table by using at least the encryption information.

BRIEF DESCRIPTION OF THE DRAWINGS

In the following embodiments of the invention are explained in greater detail, by way of example only, making reference to the drawings in which.

DETAILED DESCRIPTION

Figure 1:
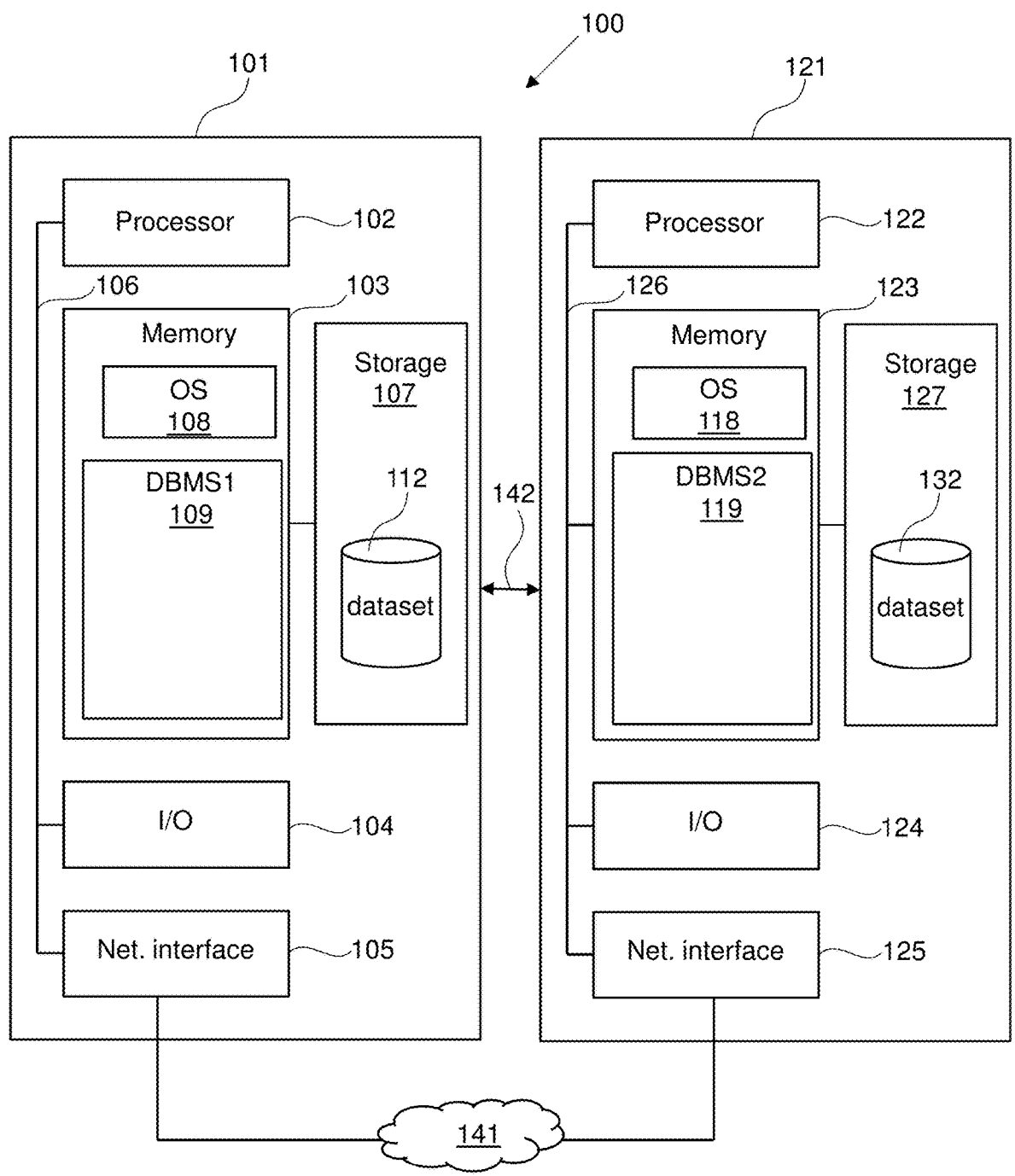
FIG. 1 depicts a data processing system according to an example of the present disclosure.

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The database system may be a hybrid database management system (DBMS) or may implement a hybrid DBMS. In order to address a multitude of workload types with different requirements and goals, the database system is composed from more than one execution engine (the first and second database engines) such that each of the execution or database engines may have a respective set of resources adapted to run on the datasets available at execution engine. For example, the first database engine may be a transactional engine that may require less resources compared to the second database engine (e.g. being an analytical engine) as its data may be smaller in size.

"Data is stored in a DBMS" means that the DBMS controls access and can access to said data, where said data is stored in a storage device of the computer system that comprises or implements the DBMS.

The term "data table" or "table" as used herein refers to a collection of data that may be presented in tabular form. Each column in the data table may represent a particular variable or attribute. Each row in the data table may represent a given member, record or entry of the data table.

The term "trusted engine" refers to an engine that fulfils one or more predefined security criteria. An untrusted engine may be an engine that does not fulfil at least one of the predefined security criteria. The trusted engine may for example comprise an access control component that controls access to data of the trusted engine such that only authorized users can access the data e.g. the authorized users may use login information that are accepted by the trusted engine. The trusted engine may implement a DBMS, and the DBMS may be referred to as a trusted DBMS.

The present disclosure may enable an automatic end-to-end solution where table data can be loaded from one source database (e.g. of a trusted DBMS) in the unencrypted form to a target database (e.g. of an untrusted DBMS) in the encrypted form. Analytical queries may be computed directly on encrypted data when running the queries on untrusted DBMSs. This may be more advantageous than accessing unencrypted data using trusted DBMS, such as shorter query runtime or lower query costs may be achieved. The present method may further enable to determine the target untrusted DBMS to reroute analytical queries based on encryption algorithms that are used to encrypt data stored in systems having untrusted DBMSs. The untrusted DBMSs may belong to a public cloud.

The present method may allow table data to be encrypted on column-level (e.g. each column may be encrypted in different encryption algorithms/keys), table-level, target engine-level, and/or on user-level. This may result in data in different format comprising encrypted and unencrypted format. Data in unencrypted format may be accessed by a trusted DBMS. The owner of the trusted DBMS, such as on-prem DBMS, may decide on what database operations a certain user partner can perform in the public cloud.

According to one embodiment, encrypting the column using a different encryption method results in a third instance of the first table and storing the third instance of the first table on the second database engine or on a third database engine of the database system. Using different encryption methods for the same column may enable to process more queries than having a single encryption format while maintaining a secure access to data.

According to one embodiment, the method further comprises determining whether to execute the query in the first database engine on the first table, on the second instance of the first table or on the third instance of the first table, the determination involving a comparison of the query with the encryption information of the second instance of the first table, the determining resulting in a decision to execute the received query on at least one of the second and third instance of the first table. This may enable various possibilities for executing the queries and may thus increase the query response efficiency of the system.

According to one embodiment, the method further comprises: determining that the first table is modified and repeating the encrypting and storing steps for modified values of the first table. This may enable to provide an up to date data and consistent content between the first and second database engines.

According to one embodiment, the determining step comprises: in response to determining that the query comprises a read only operation, determining if the second instance of the first table results from a non-deterministic encryption of the column using the encryption information, wherein in case the second instance of the first table results from non-deterministic encryption of the column the decision is set to execute the query on the second instance of the first table, otherwise the decision is set to execute the query on the first instance of the first table. A read only operation may not involve computations. For that the non-deterministic encryption method may be adequately used to encrypt data that are processed by such read only operations. This may increase the number of possible encryption methods to be used for encryption of data and may thus increase the secure aspect of the present method.

According to one embodiment, the determining step comprises: in response to determining that the query comprises an ordering operation, determining if the second instance of the first table results from an order preserving encryption of the column using the encryption information, wherein in case the second instance of the first table results from an order preserving encryption of the column the decision is set to execute the query on the second instance of the first table, otherwise the decision is set to execute the query on the first instance of the first table. For example, the query may comprise a ORDER BY SQL operator. This embodiment may enable to increase the query response efficiency of the present method as more queries can be executed including the ones for ordering encrypted entries.

According to one embodiment, the encrypting comprises: generating encryption keys using metadata of the first table, or retrieving encryption keys from a persistent storage if the encryption keys exist. This may enable as systematic method for encrypting data.

According to one embodiment, the encryption is performed using an encryption method that is user, and/or column and/or engine specific. For example, each user may be assigned a respective encryption method to be used for encrypting data of the user. Each database engine may be assigned a respective encryption method to be used for encrypting data of the database engine. Each column may be assigned a respective encryption method to be used for encrypting values of the column.

According to one embodiment, the database system is a hybrid online transaction processing (OLTP) and online analytical processing (OLAP) database system, wherein the first database engine is configured for performing OLTP processes, wherein the second database engine is configured for performing OLAP processes. This embodiment may seamlessly be integrated in existing data warehouse systems.

According to one embodiment, the method is automatically performed in response to storing the first table in the first database engine. This may speed up the data distribution process between the database engines.

According to one embodiment, the first database engine is a trusted engine and the second database engine is an untrusted engine.

According to one embodiment, the encryption method comprises at least one of: an order preserving encryption, a deterministic encryption, a non-deterministic encryption. The more encryption methods provided the higher the query response efficiency because more queries can be processed on encrypted data when several encryption methods are used.

FIG. 1 is a block diagram for a data processing system 100 for a hybrid DBMS suited for implementing method steps as involved in the disclosure. The data processing system 100 comprises a first computer system 101 (also referred to as first database engine or transactional engine) connected to a second computer system 121 (also referred to as second database engine, analytical engine or accelerator engine). The first computer system 101 may for example comprise an IBM System z. The second computer system 121 may for example comprise Netezza system.

The data processing system 100 may be a distributed system hosted as a hybrid cloud, consisting of the first computer system 101 and one or more second computer system 121, where the first computer system may comprise a trusted on-prem DBMS and the one or more second computer systems may each comprise untrusted DBMS. The second computer systems may be hosted in a public cloud.

First computer system 101 includes processor 102, memory 103, I/O circuitry 104 and network interface 105 coupled together by bus 106.

Processor 102 may represent one or more processors (e.g. microprocessors). The memory 103 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 103 can have a distributed architecture, where various components are situated remote from one another, but can be accessed by the processor 102.

Memory 103 in combination with persistent storage device 107 may be used for local data and instruction storage. Storage device 107 includes one or more persistent storage devices and media controlled by I/O circuitry 104. Storage device 107 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like.

Memory 103 may include one or more separate programs e.g. database management system DBMS1 109, each of which comprises an ordered listing of executable instructions for implementing logical functions, notably functions involved in embodiments of this invention. The software in memory 103 shall also typically include a suitable operating system (OS) 108. The OS 108 essentially controls the execution of other computer programs for implementing at least part of methods as described herein.

DBMS1 may have access to and/or control of a first dataset 112 stored on storage device 107. The first dataset 112 may for example comprise transaction data that provides real time or near real time transaction data for OLTP analysis such as postings from a manufacturing control system.

Second computer system 121 includes processor 122, memory 123, I/O circuitry 124 and network interface 125 coupled together by bus 126.

Processor 122 may represent one or more processors (e.g. microprocessors). The memory 123 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 123 can have a distributed architecture, where various components are situated remote from one another, but can be accessed by the processor 122.

Memory 123 in combination with persistent storage device 127 of the second computer system 121 may be used for local data and instruction storage. Storage device 127 includes one or more persistent storage devices and media controlled by I/O circuitry 104. Storage device 127 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like.

Memory 123 may include one or more separate programs e.g. database management system DBMS2 129, each of which comprises an ordered listing of executable instructions for implementing logical functions, notably functions involved in embodiments of this invention. The software in memory 123 shall also typically include a suitable OS 128.

The OS 128 essentially controls the execution of other computer programs for implementing at least part of methods as described herein.

DBMS2 may have or control access to a second dataset 132 stored on storage device 127 of the second computer system 121. For example, the second dataset 132 may be obtained by replicating or copying a source dataset such as the first dataset 112 from the first computer system 101 to the second computer system 121. The second dataset 132 may comprise at least part of the attributes of the first dataset 112. For example, the second dataset 132 may comprise for a given attribute more attribute values than attribute values of the given attribute in the first dataset 112.

The second computer system 121 may thus be a target of data of the first computer system 101 in that data of the first computer system 101 may be replicated or copied into the second computer system. FIG. 1 depicts for exemplification purpose only one target computer system (the second computer system 121). However, the first computer system 101 may be connected to multiple target computer systems such as the second computer system 121. Each of the target computer system may comprise a respective untrusted DBMS.

The first and second datasets 112 and 132 may be stored in different format. The formats may differ in encryption, compression, row-oriented vs. column-oriented storage, etc. For example, the first dataset 112 may be in plaintext format and the second dataset 132 may be in an encrypted format.

First computer system 101 and second computer system 121 may be independent computer hardware platforms communicating through a high-speed connection 142 or a network 141 via network interfaces 105, 125. The network 141 may for example comprise a local area network (LAN), a general wide area network (WAN), and/or a public network (e.g., the Internet). Every computer system 101 and 121 may be responsible for managing its own copies of the data.

Although shown in FIG. 1 as separate systems, the first and second computer systems may, in another example, belong to a single system e.g. sharing a same memory and processor hardware, while each of the first and second computer systems is associated with a respective DBMS and datasets e.g. the two DBMSs may be stored in the shared memory. In another example, the two database management systems DBMS1 and DBMS2 may form part of a single DBMS that enables communications and method performed by DBMS1 and DBMS2 as described herein.

The data processing system 100 may for example categorize every incoming query and execute it on one of the first and second computer systems. The first computer system 101 may be responsible for efficient lookup in transactional workloads, e.g., OLTP and may for example be optimized for accessing limited amounts of data e.g. of the first dataset 112. The second computer system 121 may for example be responsible for data scans in the scope of analytical applications, e.g., OLAP, which may require to read large amounts of data in a single query.

Figure 2:
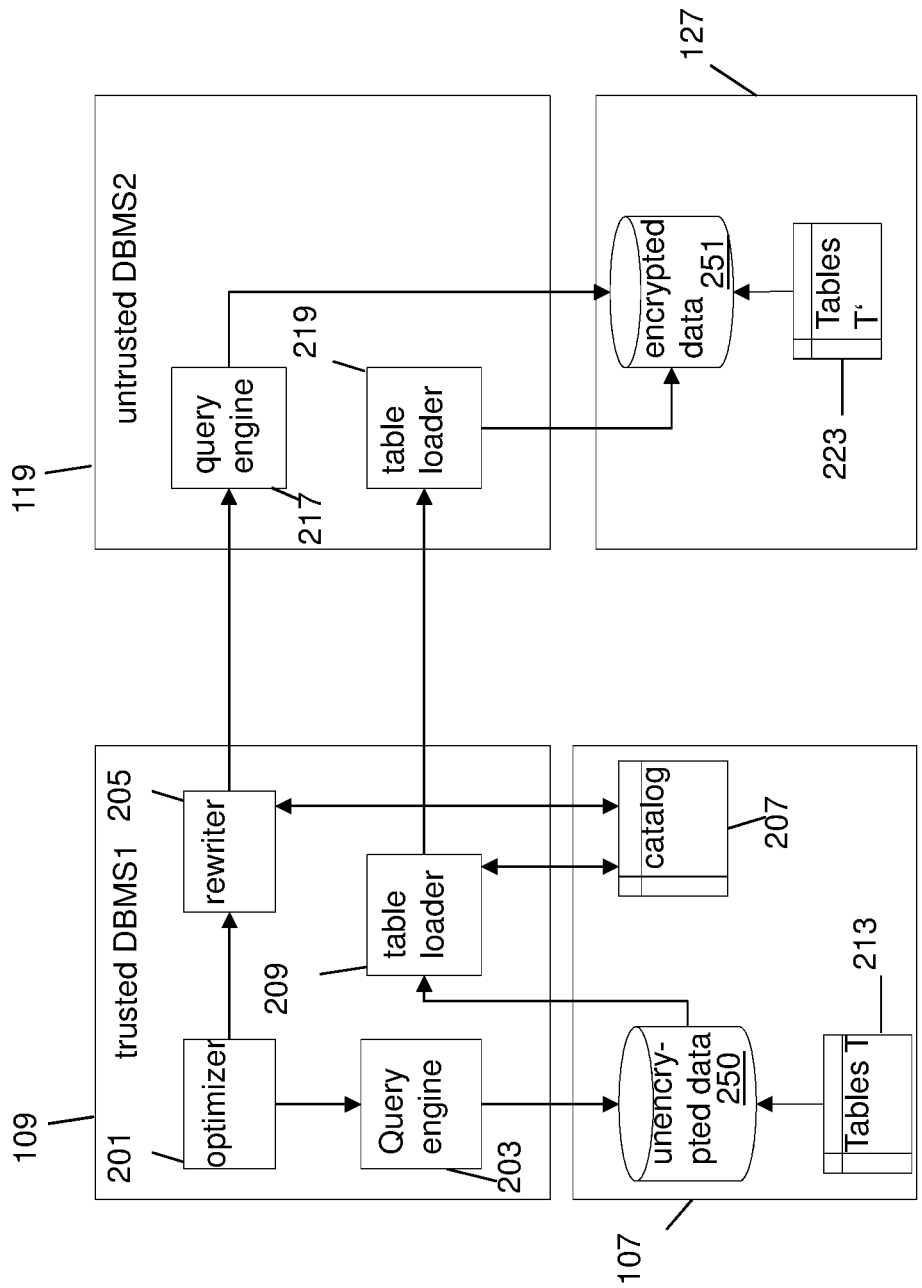
FIG. 2 is a diagram illustrating the components of database management systems of the data processing system.

FIG. 2 is a diagram illustrating the components of the two database management systems DBMS1 and DBMS2 for processing data such as datasets 112 and 132.

DBMS1 109 is referred to as a trusted DBMS1 and DBMS2 119 may be referred to as an untrusted DBMS2. The trusted DBMS1 109 comprises a query optimizer 201. The query optimizer 110 may for example be configured for generating or defining query plans for executing queries e.g. on first dataset 112.

The trusted DBMS1 109 further comprises a query engine 203 for computing or executing queries.

The trusted DBMS1 109 further comprises a rewriter 205 that is configured for rewriting queries (e.g. rewriting queries received at the optimizer 201). For example, a query received by the trusted DBMS1 109 may refer to one or more columns or attributes of the first dataset 112. The rewriter 205 may be configured for rewriting that query such that it refers to other columns (e.g. of the second dataset 132) that correspond to the columns referenced in the received query.

The trusted DBMS1 109 may further comprise a table loader 209. The rewriter 205 and table loader 209 may be configured to access a catalog 207 e.g. which is part of storage 107. The catalog 207 may for example be a persistent storage where table metadata (e.g. including encryption keys) are stored. This storage may be implemented as tables that can be accessed by the trusted DBMS1 109. The table metadata may be descriptive of the tables 213 (e.g. of the first dataset 112). For example, the metadata may indicate the encryptions keys that can be used to encrypt a given column of the tables 213. The metadata is further described with reference to FIG. 3A.

The table loader 209 may for example be configured for generating encryption keys using the table metadata retrieved from the catalog 207, if the keys don't exist yet, or it retrieves encryption keys if the keys have been generated before. And it transfers table data from the trusted DBMS1 109 to untrusted DBMS2 119. The table loader 209 may be a pluggable component to the trusted DBMS1 109, implemented as a stored procedure, a user-defined function (UDF), or other programs.

The untrusted DBMS2 119 comprises a query engine 217 that is configured to receive queries from the rewriter 205. The received queries by the query engine 217 may be rewritten queries by the rewriter 205 of the trusted DBMS1 109. The untrusted DBMS2 119 further comprises a table loader 219. The table loader 219 of the untrusted DBMS2 119 may be configured to receive data to be stored on the untrusted DBMS2 119 from the table loader 209 of the trusted DBMS1 109. The received data by the table loader 219 of the untrusted DBMS2 119 may be in an encrypted format as indicated in FIG. 2 and may be stored in tables 223 whose columns correspond to at least part of the columns of the tables 213 that are encrypted.

The table data of table 213 accessed by the trusted DBMS1 109 may be stored in the unencrypted form in storage 250 (e.g. in file systems and/or memory) as indicated in FIG. 2. Whereas the table data in tables 223 of the untrusted DBMS2 119 may be stored in an encrypted form in storage 251 (e.g. in file systems and/or memory). The decrypted form of the loaded table data in storage 132 accessible by the untrusted DBMS2 119 may be consistent with the table data of the tables 213 of the trusted DBMS1 109 and can be inversely decrypted to the original data.

Figure 3A:
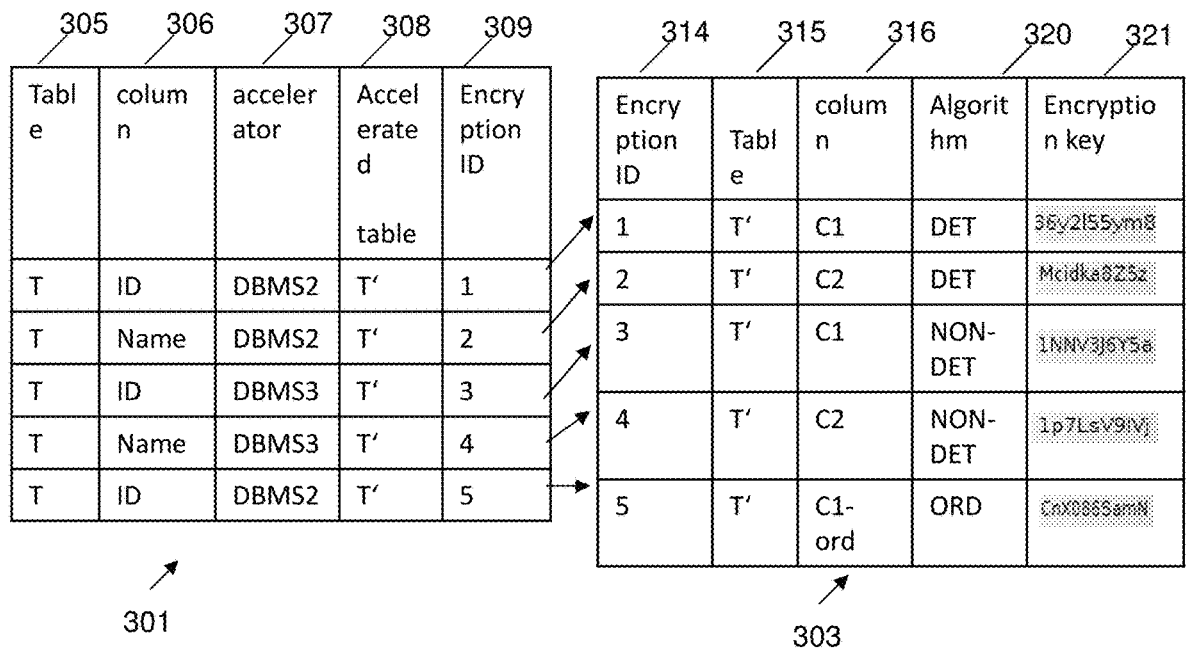
FIG. 3A depicts an example content of table metadata.

As described with reference to FIG. 2, table loader 209 of the trusted DBMS1 109 retrieves the table metadata from catalog 207. FIG. 3A depicts an example content of the table metadata in the catalog 207. The table metadata may for example be stored in data info table 301 and encryption info table 303.

Figure 3B:
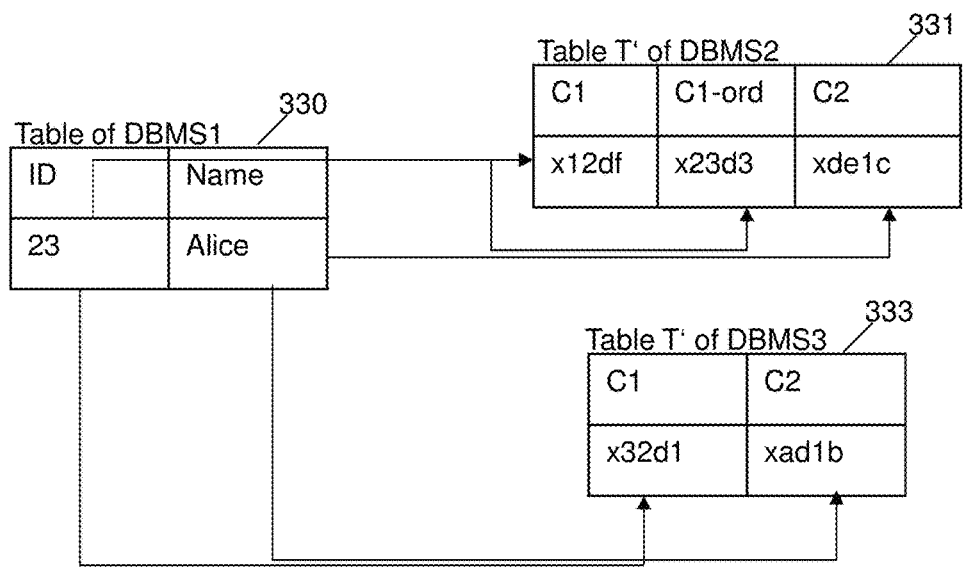
FIG. 3B illustrates the relation between content of tables of the trusted and untrusted database management systems.

The data info table 301 comprises column "Table" 305 that indicates the table (e.g. table name) that is stored in the storage device 107 of the first computer system 101 and can be accessed by the trusted DBMS1. FIG. 3B shows example content of tables T 330 (of the tables 213) indicated in the data info table 301. In the example of FIGS. 3A-B, the target computer systems where to store the encrypted data comprises two target computer systems having respectively untrusted DBMS2 and DBMS3.

The data info table 301 further comprises column "column" 306 indicating, for a given table of column 305, a column of the given table. For example, column 306 may indicate column names "ID" and "Name" of the corresponding tables.

The data info table 301 further comprises column "Accelerator" 307 having values indicating, for a given table of column 305, a target computer system such as the second computer system 121 on which the values or processed values of the column indicated in column 306 of the given table may be stored or replicated. For example, the values of column 307 may comprise an indication of the database management system of the target computer system on which the corresponding data is to be replicated.

The data info table 301 further comprises column "Accelerated Table" 308 having values indicating, for a given table of column 305, the table of the target computer system on which the values of the column indicated in column 306 of the given table are replicated.

The data info table 301 further comprises column "encryption ID" 309 having values, for a given table of column 305, indicating the encryption ID that can be used to determined details of the encryption that is performed on values of the column indicated in column 306 of the given table.

The encryption IDs of column 309 may be used to access the encryption info table 303 using column 314 of the encryption info table 303. Column 314 comprises values indicating the encryption IDs which may comprise at least encryption IDs of column 309.

The encryption info table 303 further comprises column "Table" 315 having values indicating, for a given encryption ID, the table of the target storage system that comprises the data encrypted of the column indicated in the table info table 301 associated with the given encryption ID is stored. FIG. 3B shows example content of tables T' 331-333 of the tables 223 indicated in the data info table 301

The encryption info table 303 further comprises column "column" 316 having values indicating, for a given encryption ID, the column on which the data encrypted of the column indicated in the table info table 301 associated with the given encryption ID is stored.

The encryption info table 303 further comprises column "algorithm" 320 having values indicating, for a given encryption ID, the encryption method identified by the given encryption ID.

The encryption info table 303 further comprises column "encryption key" 321 having values indicating, for a given encryption ID, the encryption key used by the encryption method identified by the given encryption ID. The encryption keys 321 are provided for exemplification purpose only and other encryptions keys may be used for each respective encryption algorithm. The encrypted values of tables 331-333 are provided for exemplification purpose to illustrate an encrypted content. The encrypted values (e.g. of table 331) may for example be obtained by other encryption keys than the encryption keys 321 in table 303 and are provided to illustrate an encrypted content of the values e.g. "Alice" and "23".

For example, from the encryption info table 303, table loader 209 of the trusted DBMS1 109 may find the encryption algorithms and encryption keys for columns of the second instances of a table of the trusted DBMS1 that are stored in untrusted DBMSs such as untrusted DBMS2 and DBMS3. Moreover, table loader 209 may check if encryption keys have been generated for a previous table load (e.g. a previous load of values of a column as the one being processed) or need to be generated for the current table load in order to use them for encryption.

For example, the unencrypted column names of the table T managed by the trusted DBMS1 are ID and Name, and their encrypted column names in other instances of table T in the untrusted DBMS2/DBMS3 are C1 and C2 respectively. This obfuscation may be only known to catalog 207 of the trusted DBMS.

C1 and C2 in the untrusted DBMS2 are encrypted using a deterministic encryption algorithm (DET), which may be a less secure encryption mechanism, because the same text may be encrypted into the same ciphertext every time. In contrast, C1 and C2 of untrusted DBMS3 are encrypted using a non-deterministic encryption algorithm (NON-DET), which may be the most secure encryption mechanism—when it encrypts the same text several times, it yields different ciphertext every time.

The reason for using different encrypting algorithms in different untrusted DBMSs may be that one untrusted DBMS is less secure than the other. For example, this may be due to the fact that one untrusted DBMS may be in a private cloud and the other may be in a public cloud.

In one example, one source column of the trusted DBMS may need multiple encrypted columns of untrusted DBMSs to enable more database operations performed over encrypted data. For example, FIG. 3A shows that the column ID of table T of trusted DBMS1 matches an additional column C1-ord of Table T' in untrusted DBMS2, because the values of this column needs to be encrypted with an order-preserving encryption algorithm (ORD), which means, the ciphertext of the column C1-ord still preserves the order of original values of the column ID in Table T. This may allow more analytical queries to be performed over encrypted data.

After table loader 209 encrypts the data of the columns in table T 330 of trusted DBMS1 109, it loads the encrypted data to the tables T' 331-333 of untrusted DBMS2 and DBMS3 as shown in FIG. 3B. The metadata of the source column (e.g. ID) may differ from that of the target column (e.g. C1). For example, ID is a numeric column but C1 (or C1-ord) may be a (VAR)CHAR column. FIG. 3B shows table T 330 of the trusted DBMS1 as containing two columns ID and Name having example values. The metadata provided by the data info table 301 and encryption info table 303, indicates how each value is to be encrypted using the corresponding one or more encryption algorithms and where to be stored. For example, the column ID of table T 330 may be encrypted by the DET and ORD algorithms, and the resulting encrypted values are stored in respective columns C1 and C1-ord of table T' 331 of the untrusted DBMS2. The column Name of table T 330 is encrypted by the DET algorithm, and the resulting encrypted values are stored in respective columns C2 of table T' 331 of the untrusted DBMS2. The columns ID and Name of table T 330 are encrypted by the DET and NON-DET algorithms, and the resulting encrypted values are stored in respective columns C1-C2 of table T' 333 of the untrusted DBMS3.

The metadata stored in the data info table 301 and encryption info table 303 enables to maintain encryption information about encryption methods and encryption keys of second instances (e.g. T') of table T of the trusted DBMS1.

Figure 4:
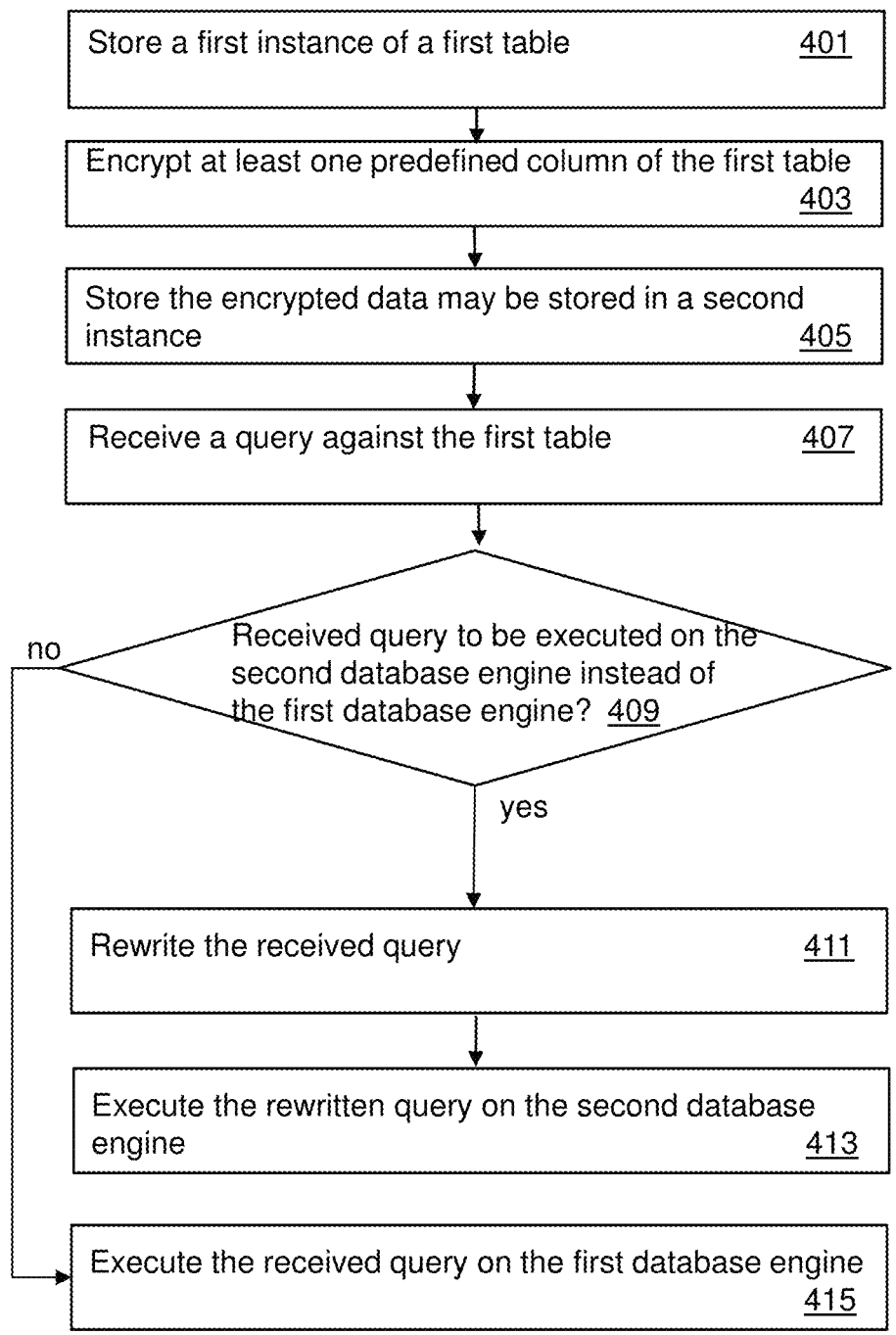
FIG. 4 is a flowchart of a method for processing queries in a database system.

FIG. 4 is a flowchart of a method for processing queries in a database system e.g. 100 comprising at least the first database engine 109 and second database engine 119.

In step 401, a first instance of a first table (e.g. for exemplification purpose, the first table may be table T 330) may be stored in the first database engine 109 in plaintext. The first table 330 may for example be received by the first database engine 109 for storage of the first data table. The first instance of the first table 330 is a copy of the data of the first table that has a given format e.g. a plaintext or unencrypted format.

In step 403, at least one predefined column (e.g. ID and NAME) of the first table 330 may be encrypted. This may enable to obtain at least one second instance (e.g. tables T' 331 and 333) of the first table containing at least part of the data of the first table in encrypted format. For example, each attribute value stored in the predefined column may be encrypted. The second table 331-333 may comprise the encrypted values. The encryption may be performed by the table loader 209 at the first database engine 109.

The predefined column may be user defined e.g. a selection of the predefined column may be received, wherein the selection indicates to encrypts the content of the predefined column. In another example, the at least one predefined column may comprise all columns of the first table.

The table loader 209 may be configured to read the catalog 207 to identify the encryption method that can be used for encrypting the predefined column. For example, using the first table 330 as depicted in FIG. 3A, and if the predefined column is column ID of the first table 330, the table loader 209 may read the data info table 301 to identify the encryption ID that corresponds to the predefined column ID of first table T 330 and where to store the results of encryption. In this case, the encryption IDs 1 and 3 may be identified and respective encryption results may be stored in storage systems managed by untrusted DBMS2 and DBMS3 respectively. Using the encryption info table 303, the table loader 209 may read that DET and NON-DET encryption algorithms and corresponding encryption keys may be used for encrypting the values of column ID for untrusted DBMS2 and DBMS3 respectively. The table loader 209 may send the resulting encrypted data to the second database engine 119.

In step 405, the encrypted data may be stored in a second instance 331-333 of the first table 330 in the second database engine 119. For example, the table loader 219 may receive the encrypted data from the table loader 209 any may store the received encrypted data in a tabular format resulting in the second instance 331-333 of the first table. For example, the encrypted data may be received in the tabular form of value by value. In another example, the encrypted data may be received in CSV (comma separated values) format.

Following the above example, the encrypted data may be stored in the second instances of the first table T 330, e.g. tables T' 331 and 333.

In step 407, a query against the first table 330 may be received at the trusted DBMS1 109. The query may refer to one or more columns of the first table 330. For example, the query may comprise a read request for reading a column of the first table 330. In another example, the query may comprise a selection criterion involving one or more columns of the first table 330.

After encrypted data has been loaded to untrusted DBMS2, clients or applications may issue queries against the trusted DBMS1. The client may not change the application such as SQL operations and the operations may be performed either over the unencrypted data of the trusted DBMS1 or over the encrypted data of the untrusted DBMS2.

In step 409, it may be determined (e.g. by the optimizer 201) whether to execute the query in the first database engine 109 on the first table 330 or in the second database engine 119 on the second instance of the first table 331-333. The determination involves a comparison of the query with the encryption information 303 of the second instance of the first table to determine whether the second database engine can execute the query and provide the requested results of the query as exemplified below. In one example, if there are multiple second database engines, there may be more than one second database engine that fulfils the determination based on encryption information. In this case, the determination to execute the query may in addition involve the comparison of the performance (e.g. processing resources) of each of the more than one second database engine to identify one of them for execution of the query (e.g. the one with the best performance). In another example, one of the more than one second database engine may randomly be identified for execution of the query. I another example, the performance comparison may be first performed and then followed by the comparison of the encryption information with the query.

In response to deciding to execute the query in the second database engine (e.g. because the comparison is successful in that the encryption information (and performance) indicates that the second database engine can execute the query), the query against the second instance of the first table may be rewritten in step 411 by the rewriter 205 by using at least one of the information stored in data info table and encryption info table 301-303 of the second instance of the first table. The rewritten query may then be executed in step 413 on the second database engine. In response to deciding to execute the query in the first database engine (e.g. because none of the second database engines fulfil the determination of step 409) the received query may be executed in step 415 on the first database engine.

Following the example of first table T 330 shown in FIG. 3B, a client may issue the following query which involves an ordering operation.

SELECT*FROM T WHERE NAME='Alice' ORDER BY(ID)

The encryption information provided by the encryption info table 303 indicates that the table T' 331 of DBMS2 has content encrypted in deterministic and order-preserving encryption schemes, whereas the table T' 333 of DBMS3 has content encrypted in a non-deterministic encryption scheme. Thus, the issued query needs to perform SQL operations on deterministic and order-preserving encrypted data. Optimizer 201 may then decide to reroute the issued query to untrusted DBMS2. For that, the issued query may be rewritten by rewriter 205 such that the second instance table and columns corresponding to the first table and columns of the query may be referenced in the rewritten query. For example, the searched value "Alice" may be replaced by its encrypted form "xdelc". The encrypted value "xdelc" is provided for exemplification purpose only to illustrate an encrypted content of value "Alice". The rewritten query may be as follows:

SELECT C1, C2 FROM DBMS2. T' WHERE C2='xdel c' ORDER BY(C1-ord)

This rewritten query may be computed by query engine 217 of untrusted DBMS2 119 e.g. as a normal query. Untrusted DBMS2 may not be modified for processing the rewritten query and may not know the query or the data is encrypted. The ciphertext of table T' 331 may be treated as normal plain text in a (VAR)CHAR column. This may enable a transparent implementation of the present method. Upon executing the rewritten query at the untrusted DBMS2, query engine 217 passes the encrypted results back to the query engine 203 of the trusted DBMS 109 with the following result set shown in the following table 1 which comprises encrypted values of columns C1 and C2 that represent the result of processing the query on table T' of DBMS2:

| C1 | C2 |
|---|---|
| x12df | xde1c |
| x13df | xde1c |

Query engine 203 of the trusted DBMS1 109 retrieves encryption keys for C1, C2 of T' 331 from catalog 207 by obtaining them from table metadata 301-303. Query engine 203 of the trusted DBMS1 109 may decrypt received results using the encryption keys and returns the results to the client. The following table 2 comprises the results of decrypting the above table 1.

| ID | Name |
|---|---|
| 23 | Alice |
| 24 | Alice |

In another example, the Query engine 203 of the trusted DBMS1 109 may not decrypt the results and return the results in their encrypted format to the client. The client may then decrypt the received encrypted results if he has the corresponding encryption keys.

In another example, the client may issues the following read-only query, which does not require any computation e.g. do not perform SQL operations on encrypted data.

SELECT*FROM T

The table data of untrusted DBMS3 is encrypted in non-deterministic scheme. Thus, the query may be executed by the untrusted DBMS3. As mentioned before, only queries having SQL operations may not be executed on non-deterministically encrypted table data. Therefore, if running this read-only query would be more advantageous on untrusted DBMS3, optimizer 201 may reroute the read-only query to untrusted DBMS3 to run on non-deterministic encrypted data.

Once the decision to reroute the read-only query is made by optimizer 201, rewriter 205 rewrites the read-only query to read encrypted values of T from the second instance T' of T. The rewritten query may be as follows:

SELECT C1, C2 FROM DBMS3 T'

Untrusted DBMS3 is unmodified and unaware of whether the data or the query is encrypted and can perform this query as a normal query. Query engine of DBMS3 passes the encrypted result back to query engine 203 of the trusted DBMS 109 in the following table 3. Table 3 contains data in encrypted format that represents the result of processing the read-only query on T' of DBMS3.

| C1 | C2 |
|---|---|
| x32d1 | xad1b |
| x1def | xdbef |
| x1234 | x345d |

Query engine 203 of the trusted DBMS1 109 retrieves encryption keys for C1, C2 of T' 333 in DBMS3 from catalog 207 by obtaining them from table metadata 301-303.

Query engine 203 of the trusted DBMS1 109 may decrypt the results using the encryption keys and returns the results to the client as follows.

| ID | Name |
|----|------|
| 23 | Alice |
| 24 | Alice |
| 23 | Bob |

In another example, the Query engine 203 of the trusted DBMS1 109 may not decrypt the results and returns the results in their encrypted format to the client. The client may then decrypt the received encrypted results if he has the corresponding decryption keys.

The present method may be advantageous as described with following example use cases.

The present method may enable a selective access to encrypted data based on encryption techniques. If for example, trusted user A only has an encryption key A, and if user A performs a query against tables T' 331-333 of the untrusted DBMSs having data encrypted with encryption key A and receives the result, the user A can decrypt the result encrypted with the key A. However, if the user performs a query against tables S' which are encrypted using different keys and receives the result, the user A won't be able to decrypt the result because it is encrypted using a different key e.g. key C.

In another use case, users who are interested in putting their on-prem data in untrusted systems hosted in the public cloud and share some of their data with specific user partners, the present method may be advantageous. The data can be encrypted based on selected encryption strategies, such as column/table/user-level and different encryption schemes. The owner of the data can determine which parts of the data are shared with the user partners and which database operations are allowed to be performed by them based on the encryption method used. For example, unlike user partner A, the user partner B can only issue queries against tables T' 331-333 without any SQL operations, and he decrypts the query results with his key. This is because his key may decrypt only data encrypted with encryption method that enables read-only queries. The user partner A can issue queries with ORDER BY and GROUP BY against the same data encrypted in order-preserving or deterministic encryption schemes, and he decrypts the query results with their key. This allows different data usage models. For example, if the user partner B has more privileged access to data, he can perform more analytical queries. For example, depending on the user privileges, a user may be provided with one or more keys associated with each encrypted data. Based on the encryption keys owned by the user, the user may perform queries on encrypted data that he can decrypt with his keys.

In a further use case, the system 100 and the present method may for example be used for archiving and backing up data of the trusted DBMS1 109 in public cloud comprising untrusted DBMSs.

For that, historical data of trusted DBMS1 may be archived in untrusted DBMS2 in encrypted format using the present method. For example, the historical data may be a first table of the trusted DBMS1 and it may be encrypted and stored as a second instance of the first table in the untrusted DBMS2. And current data of the trusted DBMS1 may be backed up in untrusted DBMS3 in encrypted format. When a disaster happens, users can recover data by unloading the encrypted data back to the trusted DBMS1. Furthermore, other trusted users of another trusted DBMS (e.g. DBMS4) can unload the encrypted archived or baked up data to their trusted DBMS4 and decrypt the data, as long as they have decryption keys to the encrypted data. This may allow different data centers to backup or recover their data on the untrusted DBMSs hosted in the public cloud. In this example, trusted DBMS1 has current data in unencrypted format. Untrusted DBMS2 has historical data in encrypted format. Untrusted DBMS3 has the current data of the trusted DBMS1 in encrypted format and trusted DBMS4 may unload historical data of the untrusted DBMS2 and may thus comprise the historical data in unencrypted format.

In addition, a user may wish to perform queries on current data as well as on the historical data already encrypted and archived on cloud. For that, trusted DBMS1 may be used (e.g. by means of IBM DB2 Analytics Accelerator High-Performance Storage Saver) to perform a transparent query such as SELECT*FROM T, and may retrieve the results from both table T in trusted DBMS1 as well as table T' in untrusted DBMS2, because part of data in table T has been archived to untrusted DBMS2. For a user of untrusted DBMS2 to get the same full results, the user can issue a query on the archived historical data in trusted DBMS4–SELECT*FROM T and another query on the encrypted current data in untrusted DBMS3–SELECT*FROM T'.

This may enable a secure and efficient data sharing and database operations via the cloud of DBMSs.

The present method may enable an end-2-end solution of automatically encrypting table column data and transferring the data from a trusted DBMS to one or multiple untrusted DBMSes in a distributed system, which may be hosted in a hybrid cloud. The data on the trusted DBMS is stored in the unencrypted form in file systems and memory, whereas the data on the untrusted DBMSs may be stored in the encrypted form in file systems and memory. The present method may enable fetching unencrypted data from a trusted seeding DBMS, encrypting the data of a table column of the trusted DBMS and transferring to one or multiple table columns of the untrusted DBMSes. For that, a persistent storage of the trusted DBMS such as a catalog to store and fetch table metadata and encryption related information may be used. Encryption keys may be generated based on the table metadata or encryption keys may be retrieved from the persistent storage if encryption keys exist. Decrypted table data of the target tables on the untrusted DBMSs may be consistent with the table data of the source tables of the trusted DBMS.

The present method may not need to modify the existing DBMSs by implementing pluggable components to allow table data encryption, such as Table Loader 209. The same table column data may be encrypted in the same or different encryption algorithms, using the same or different encryption keys on column-level, table-level, accelerator-level, or/and user-level.

The present method may not require VPN or private network setup between the trusted DBMS and the untrusted DBMSs because the table data is in the encrypted form over Internet.

Target untrusted DBMSs are identified based on encryption schemes used for their data in order to reroute analytical queries to these identified targets. For analytical queries that do not require SQL operations on encrypted data, the queries maybe rerouted to an untrusted DBMS where the table data is encrypted in a non-deterministic encryption scheme. For analytical queries that require SQL operations on encrypted data, the queries may be rerouted to an untrusted DBMS where the table data is encrypted in a deterministic encryption scheme. The queries for being rerouted are rewritten in the encrypted form such that the queries can be processed over encrypted data. Untrusted DBMSs may not need to be modified to perform rewritten queries over encrypted data. An untrusted DBMS is unaware of if the data or queries are encrypted or not and it can compute rewritten queries as other normal unencrypted queries.

In another example, a method for processing queries in a database system having a first database engine and a second database engine is provided. The method comprises: storing a first instance of the first table in the first database engine in plaintext; encrypting at least selected columns of the first table, resulting in a second instance of the first table containing at least part of the data of the first table in encrypted form; storing the second instance of the first table in the second database engine; maintaining encryption information about encryption methods and encryption keys of the second instance in the database system; receiving a query against the first table; determining whether to execute the query in the first database engine or the second database engine, the determination involving comparison of the query type with the encryption information of the second instance of the first table; in response to deciding to execute the query in the second database engine, rewriting the query against the second instance of the first table by using at least the encryption information of the second instance.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product comprising a non-transitory computer-readable storage medium having computer-readable program code embodied therewith, the computer-readable program code configured to be executed by one or more processors of a database system to perform:
   storing a first instance of a first table comprising data in a first database engine in plaintext;
   encrypting at least one predefined column of the first table, resulting in a second instance of the first table containing at least part of the data of the first table in encrypted format;
   storing a second instance of the first table in a second database engine;
   maintaining encryption information about a plurality of encryption methods and encryption keys used for the encryption in the database system;
   receiving a query against the first table;
   determining whether to execute the query in the first database engine on the first table or the second database engine on the second instance of the first table, the determining involving a comparison of the query with the encryption information of the second instance of the first table, the determining resulting in a decision; and
   in case of the decision to execute the query in the second database engine, rewriting the query against the second instance of the first table by using at least the encryption information.

2. The computer program product of claim 1, wherein the computer-readable program code is configured to be executed by the one or more processors to perform:
   encrypting the column using a different encryption method, resulting in a third instance of the first table and storing the third instance of the first table on the second database engine or on a third database engine of the database system.

3. The computer program product of claim 2, wherein the computer-readable program code is configured to be executed by the one or more processors to perform:
   determining whether to execute the query in the first database engine on the first table, on the second instance of the first table or on the third instance of the first table, the determining involving a comparison of the query with the encryption information of the second instance of the first table, the determining resulting in a decision to execute the received query on at least one of the second and third instance of the first table.

4. The computer program product of claim 1, wherein the computer-readable program code is configured to be executed by the one or more processors to perform:
   determining that the first table is modified and repeating the encrypting and storing steps for modified values of the first table.

5. The computer program product of claim 1, wherein the determining further comprises:
   in response to determining that the query comprises a read only operation, determining if the second instance of the first table results from a non-deterministic encryption of the column using the encryption information, wherein in case the second instance of the first table results from non-deterministic encryption of the column the decision is set to execute the query on the second instance of the first table, otherwise the decision is set to execute the query on the first instance of the first table.

6. The computer program product of claim 1, wherein the determining further comprises:
   in response to determining that the query comprises a read operation only, determining if the second instance of the first table results from an order preserving encryption of the column using the encryption information, wherein in case the second instance of the first table results from an order preserving encryption of the column the decision is set to execute the query on the second instance of the first table, otherwise the decision is set to execute the query on the first instance of the first table.

7. The computer program product of claim 1, wherein the encrypting further comprises:
   generating a plurality of encryption keys using metadata of the first table, or retrieving encryption keys from a persistent storage if the encryption keys exist.

8. The computer program product of claim 1, wherein the encryption is performed using an encryption method that is user, and/or column and/or engine specific.

9. The computer program product of claim 1, wherein the database system is a hybrid online transaction processing (OLTP) and online analytical processing (OLAP) database system, wherein the first database engine is configured to perform OLTP processes, wherein the second database engine is configured to perform OLAP processes.

10. A database system comprising:
    a first database engine comprising a first processor and a first memory; and
    a second database engine comprising a second processor and a second memory, wherein the database system is configured to perform:
    storing a first instance of a first table comprising data in the first database engine in plaintext;
    encrypting at least one predefined column of the first table, resulting in a second instance of the first table containing at least part of the data of the first table in encrypted format;

storing a second instance of the first table in the second database engine;

maintaining encryption information about a plurality of encryption methods and encryption keys used for the encryption in the database system;

receiving a query against the first table;

determining whether to execute the query in the first database engine on the first table or the second database engine on the second instance of the first table, the determining involving a comparison of the query with the encryption information of the second instance of the first table, the determining resulting in a decision; and in case of the decision to execute the query in the second database engine, rewriting the query against the second instance of the first table by using at least the encryption information.

11. The database system of claim 10, wherein the database system is configured to perform:

encrypting the column using a different encryption method, resulting in a third instance of the first table and storing the third instance of the first table on the second database engine or on a third database engine of the database system.

12. The database system of claim 11, wherein the database system is configured to perform:

determining whether to execute the query in the first database engine on the first table, on the second instance of the first table or on the third instance of the first table, the determining involving a comparison of the query with the encryption information of the second instance of the first table, the determining resulting in a decision to execute the received query on at least one of the second and third instance of the first table.

13. The database system of claim 10, wherein the database system is configured to perform:

determining that the first table is modified and repeating the encrypting and storing steps for modified values of the first table.

14. The database system of claim 10, wherein the determining further comprises:

in response to determining that the query comprises a read only operation, determining if the second instance of the first table results from a non-deterministic encryption of the column using the encryption information, wherein in case the second instance of the first table results from non-deterministic encryption of the column the decision is set to execute the query on the second instance of the first table, otherwise the decision is set to execute the query on the first instance of the first table.

15. The database system of claim 10, wherein the determining further comprises:

in response to determining that the query comprises a read operation only, determining if the second instance of the first table results from an order preserving encryption of the column using the encryption information, wherein in case the second instance of the first table results from an order preserving encryption of the column the decision is set to execute the query on the second instance of the first table, otherwise the decision is set to execute the query on the first instance of the first table.

16. The database system of claim 10, wherein the encrypting further comprises:

generating a plurality of encryption keys using metadata of the first table, or retrieving encryption keys from a persistent storage if the encryption keys exist.

17. The database system of claim 10, wherein the encryption is performed using an encryption method that is user, and/or column and/or engine specific.

18. The database system of claim 10, wherein the database system is a hybrid online transaction processing (OLTP) and online analytical processing (OLAP) database system, wherein the first database engine is configured to perform OLTP processes, wherein the second database engine is configured to perform OLAP processes.

* * * * *